US010404138B2

(12) United States Patent
Kawashima et al.

(10) Patent No.: US 10,404,138 B2
(45) Date of Patent: Sep. 3, 2019

(54) ROTARY ELECTRIC MACHINE HAVING GAS COOLERS

(71) Applicant: MITSUBISHI ELECTRIC CORPORATION, Chiyoda-ku, Tokyo (JP)

(72) Inventors: Koji Kawashima, Tokyo (JP); Shingo Kingetsu, Tokyo (JP); Masahiro Kondo, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 362 days.

(21) Appl. No.: 15/322,579

(22) PCT Filed: Nov. 18, 2014

(86) PCT No.: PCT/JP2014/080501
§ 371 (c)(1),
(2) Date: Dec. 28, 2016

(87) PCT Pub. No.: WO2016/079806
PCT Pub. Date: May 26, 2016

(65) Prior Publication Data
US 2017/0141651 A1    May 18, 2017

(51) Int. Cl.
*H02K 9/06* (2006.01)
*H02K 5/20* (2006.01)
(Continued)

(52) U.S. Cl.
CPC ............... *H02K 9/06* (2013.01); *H02K 5/20* (2013.01); *H02K 7/14* (2013.01); *H02K 9/18* (2013.01)

(58) Field of Classification Search
CPC ............... H02K 9/06; H02K 5/20; H02K 7/14
See application file for complete search history.

(56) References Cited

U.S. PATENT DOCUMENTS 3,348,081 A    10/1967   Willyoung
4,845,394 A    7/1989    Kleinhans
(Continued)

FOREIGN PATENT DOCUMENTS

DE    1538810 A1    2/1970
JP    52-009807 A    1/1977
(Continued)

OTHER PUBLICATIONS

Office Action (Notice of Reasons for Rejection) dated Aug. 22, 2017, by the Japanese Patent Office in Japanese Patent Application No. 2016-559724, and an English Translation of the Office Action. (4 pages).

(Continued)

*Primary Examiner* — Emily P Pham
(74) *Attorney, Agent, or Firm* — Buchanan Ingersoll & Rooney PC

(57) ABSTRACT

Gas coolers one of which is housed in a gas cooler chamber provided at an upper portion of a casing and installed near an opening of the casing above each stator coil end, are provided. A gas circulation passage is formed in which a cooling gas circulates through a space A provided at an intake side of each fan→a space B surrounding the fan→the gas cooler chamber→the gas cooler→a space C including the stator coil end→a gap between a rotor and a stator and gas passages formed in the rotor and the stator→a space D between an outer periphery of the stator and the casing→the space A.

11 Claims, 5 Drawing Sheets

(51) Int. Cl.
*H02K 7/14* (2006.01)
*H02K 9/18* (2006.01)

(56) References Cited

U.S. PATENT DOCUMENTS

| | | | | |
|---|---|---|---|---|
| 6,359,350 | B1* | 3/2002 | Kaiho | H02K 9/12 |
| | | | | 310/52 |
| 6,703,729 | B2* | 3/2004 | Weeber | H02K 9/18 |
| | | | | 310/52 |
| 2004/0090131 | A1 | 5/2004 | Hattori et al. | |
| 2006/0055255 | A1 | 3/2006 | Hattori et al. | |
| 2008/0012437 | A1* | 1/2008 | Kabata | H02K 9/10 |
| | | | | 310/54 |
| 2012/0128512 | A1* | 5/2012 | Vande Sande | F04D 25/0606 |
| | | | | 417/410.1 |

FOREIGN PATENT DOCUMENTS

| | | |
|---|---|---|
| JP | S53-146104 A | 12/1978 |
| JP | 2007-89255 A | 4/2007 |
| JP | 5388961 B2 | 1/2014 |
| WO | 02/071577 A1 | 9/2002 |

OTHER PUBLICATIONS

Notification of Transmittal of the International Search Report and the Written Opinion of the International Searching Authority (Forms PCT/ISA/210, PCT/ISA/220 and PCT/ISA/237) dated Feb. 24, 2015, by the Japanese Patent Office in corresponding International Application No. PCT/JP2014/080501, and partial English translation. (11 pages).

Office Action dated Aug. 24, 2018, by the Chinese Patent Office in corresponding Chinese Patent Application No. 201480083324.4 and English translation of the Office Action. (14 pages).

Extended European Search Report dated May 25, 2018, issued by the European Patent Office in corresponding European Application No. 14906287.9. (10 pages).

Chinese Office Action dated Apr. 1, 2019 of corresponding Chinese patent application No. CN201480083324.4 with English translation (12 pages).

* cited by examiner

I-I CROSS-SECTION

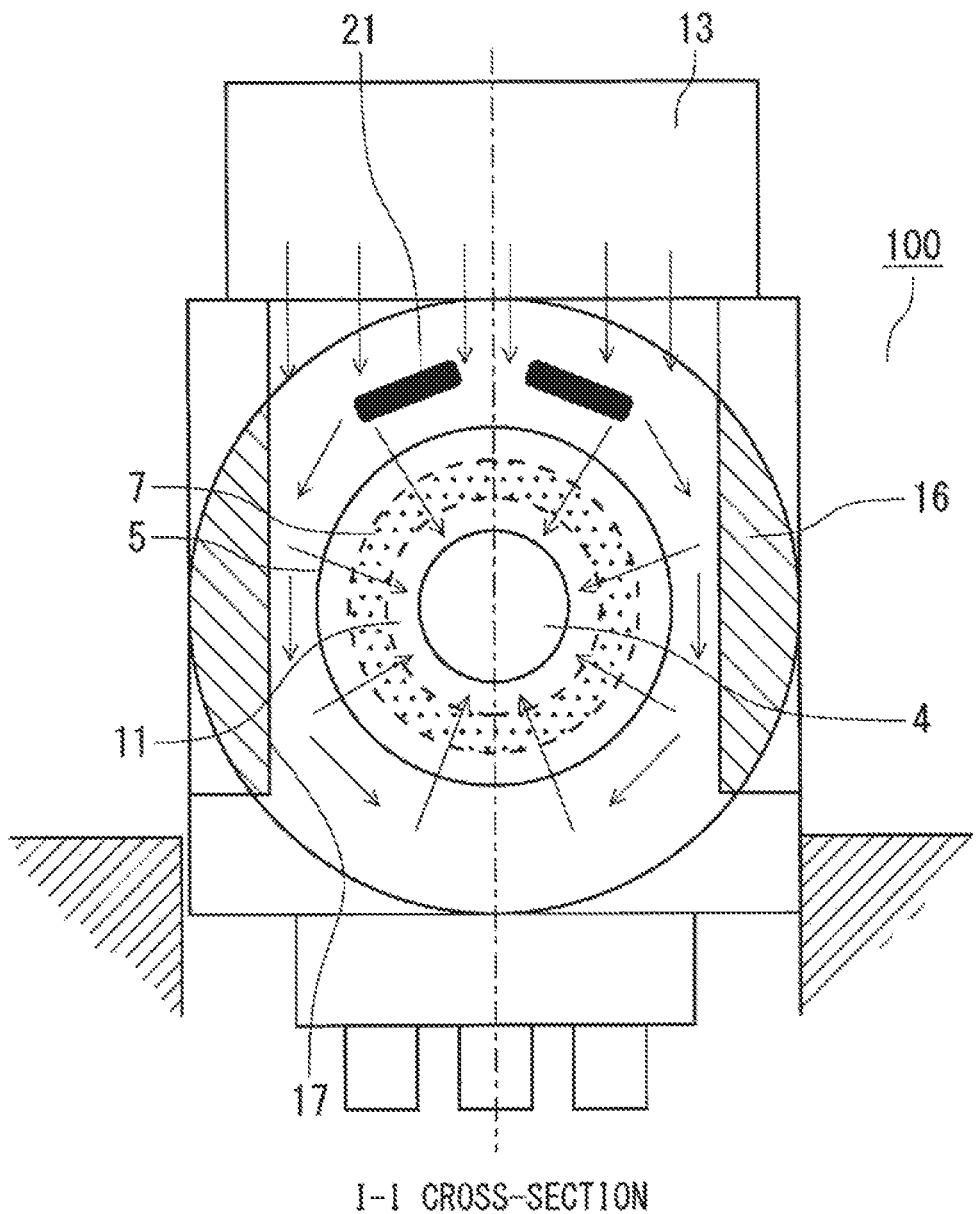

ROTARY ELECTRIC MACHINE HAVING GAS COOLERS

TECHNICAL FIELD

The present invention relates to a rotary electric machine including a stator and a rotor housed in a casing filled with a cooling gas, and a gas cooler.

BACKGROUND ART

A conventional rotary electric machine has a structure in which a cooling gas circulates in the order of a space A provided at the intake side of a fan→a space B surrounding the fan→a gas cooler chamber→a gas cooler→a space C including a stator coil end→a gap between a rotor and a stator and gas passages formed in the rotor and the stator→a space D between the outer periphery of the stator and a casing→the space A, and four gas coolers are provided at the side surface of the rotary electric machine (e.g., Patent Document 1).

CITATION LIST

Patent Document

Patent Document 1: Japanese Patent No. 5388961 (Paragraphs [0013] to [0015], FIG. 2, FIG. 3)

SUMMARY OF THE INVENTION

Problems to be Solved by the Invention

Regarding the structure of the rotary electric machine disclosed in Patent Document 1, the entire rotary electric machine is large in a width direction thereof, so that a wide installation area is required. Thus, there is a problem that the degree of freedom in installation of the rotary electric machine becomes low.

The present invention has been made to solve the above-described problem, and an object of the present invention is to provide a rotary electric machine that allows an installation area thereof to be decreased to increase the degree of freedom in installation of the rotary electric machine without deteriorating cooling performance for stator coil ends.

Solution to the Problems

A rotary electric machine according to the present invention includes: a stator disposed within a casing filled with a cooling gas, the stator including a stator core, a stator coil, and stator coil ends at both end portions of the stator coil; a rotor disposed at an inner peripheral side of the stator with a gap therebetween and including a rotor core mounted on a rotation shaft and a rotor coil; fans mounted near both end portions of the rotation shaft and each configured to suck the cooling gas from an axial side with a side opposite to the rotor coil as an intake side and send the cooling gas to an outer peripheral side; and gas coolers housed in gas cooler chambers provided at an upper portion of the casing in which the stator coil ends are located, the gas coolers being installed near openings of the casing, wherein: a gas circulation passage is formed in which the cooling gas sucked by each fan from a space A provided at the intake side of the fan circulates through a space B surrounding the fan→the gas cooler chamber→the gas cooler→a space C including the stator coil end→the gap between the rotor and the stator and gas passages formed in the rotor and the stator→a space D between an outer periphery of the stator and the casing→the space A; and the one gas cooler is installed above each stator coil end.

Effect of the Invention

The rotary electric machine according to the present invention includes the gas coolers housed in the gas cooler chambers provided at an upper portion of the casing in which the stator coil ends are located, the gas coolers being installed near openings of the casing, the gas circulation passage is formed in which the cooling gas circulates through the space A provided at the intake side of each fan→the space B surrounding the fan→the gas cooler chamber→the gas cooler→the space C including the stator coil end→the gap between the rotor and the stator and gas passages formed in the rotor and the stator→the space D between an outer periphery of the stator and the casing→the space A, and the one gas cooler is installed above each stator coil end. Thus, the installation area of the rotary electric machine can be decreased to increase the degree of freedom in installation of the rotary electric machine, without deteriorating cooling performance for the stator coil ends.

BRIEF DESCRIPTION OF THE DRAWINGS

FIG. 5 is a front cross-sectional view of the rotary electric machine according to Embodiment 2 of the present invention.

DESCRIPTION OF EMBODIMENTS

Embodiment 1

Embodiment 1 relates to a rotary electric machine in which one gas cooler is installed within each gas cooling chamber provided at an upper surface of a casing, an opening is provided in the casing directly above each stator coil end, and partition walls are provided so as to partition off a space (space C) surrounding a stator coil end portion and a passage for a cooling gas from a space (space D) between a stator outer periphery and the casing toward a space (space A) at the intake side of each fan, thereby ensuring a cooling gas passage.

Hereinafter, the configuration and operation of a rotary electric machine 1 according to Embodiment 1 of the present invention will be described with reference to FIG. 1, which is a side cross-sectional view of the rotary electric machine, FIG. 2, which is a front cross-sectional view of the rotary electric machine, and FIG. 3, which is a plan cross-sectional view of the rotary electric machine.

Figure 1:
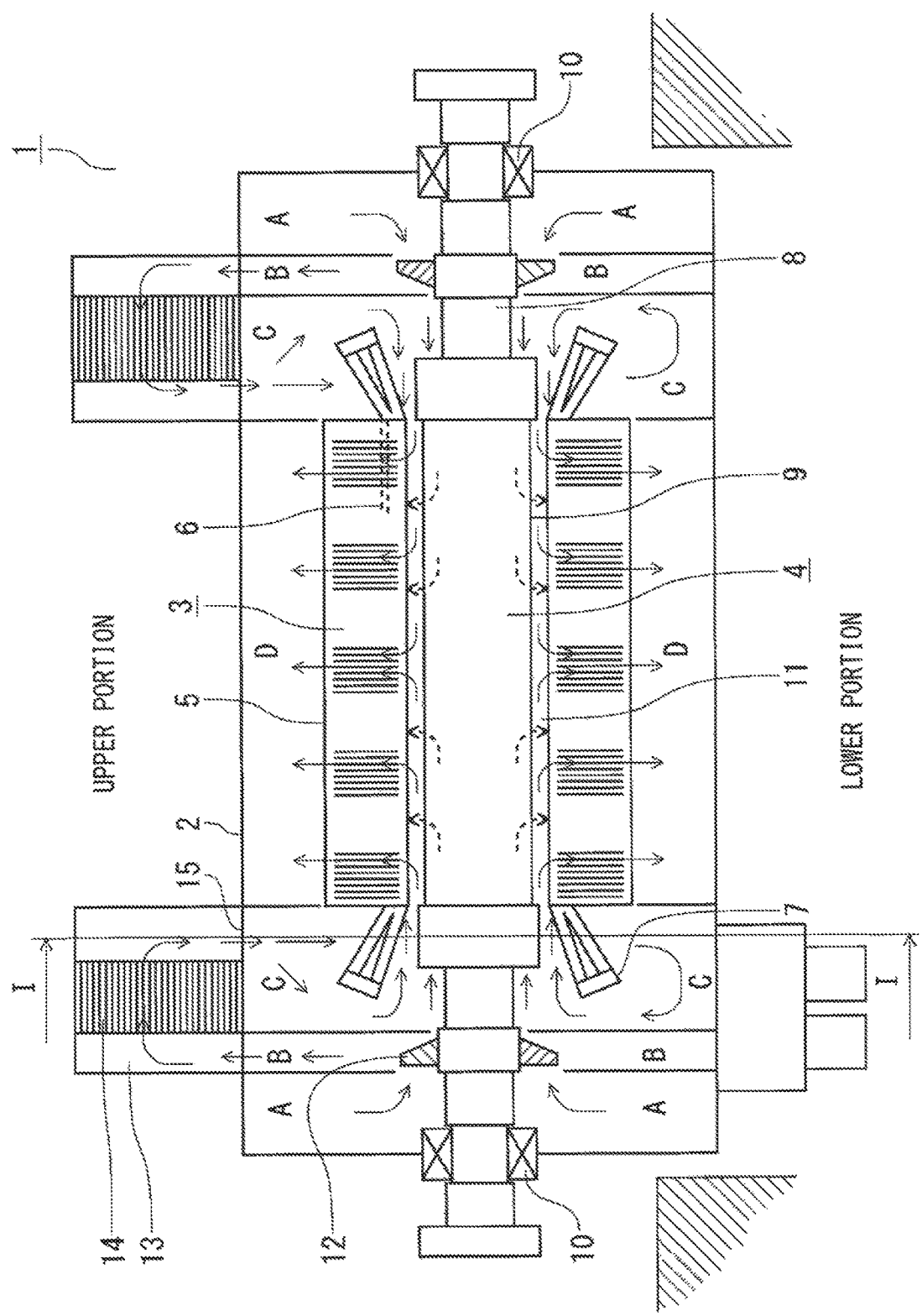
FIG. 1 is a side cross-sectional view of a rotary electric machine according to Embodiment 1 of the present invention.

FIG. 1 is a cross-sectional view of the rotary electric machine 1 of Embodiment 1 of the present invention as viewed from a side surface thereof, and shows a cross-sectional view taken along a vertical plane passing through the central axis of a rotor.

Figure 2:
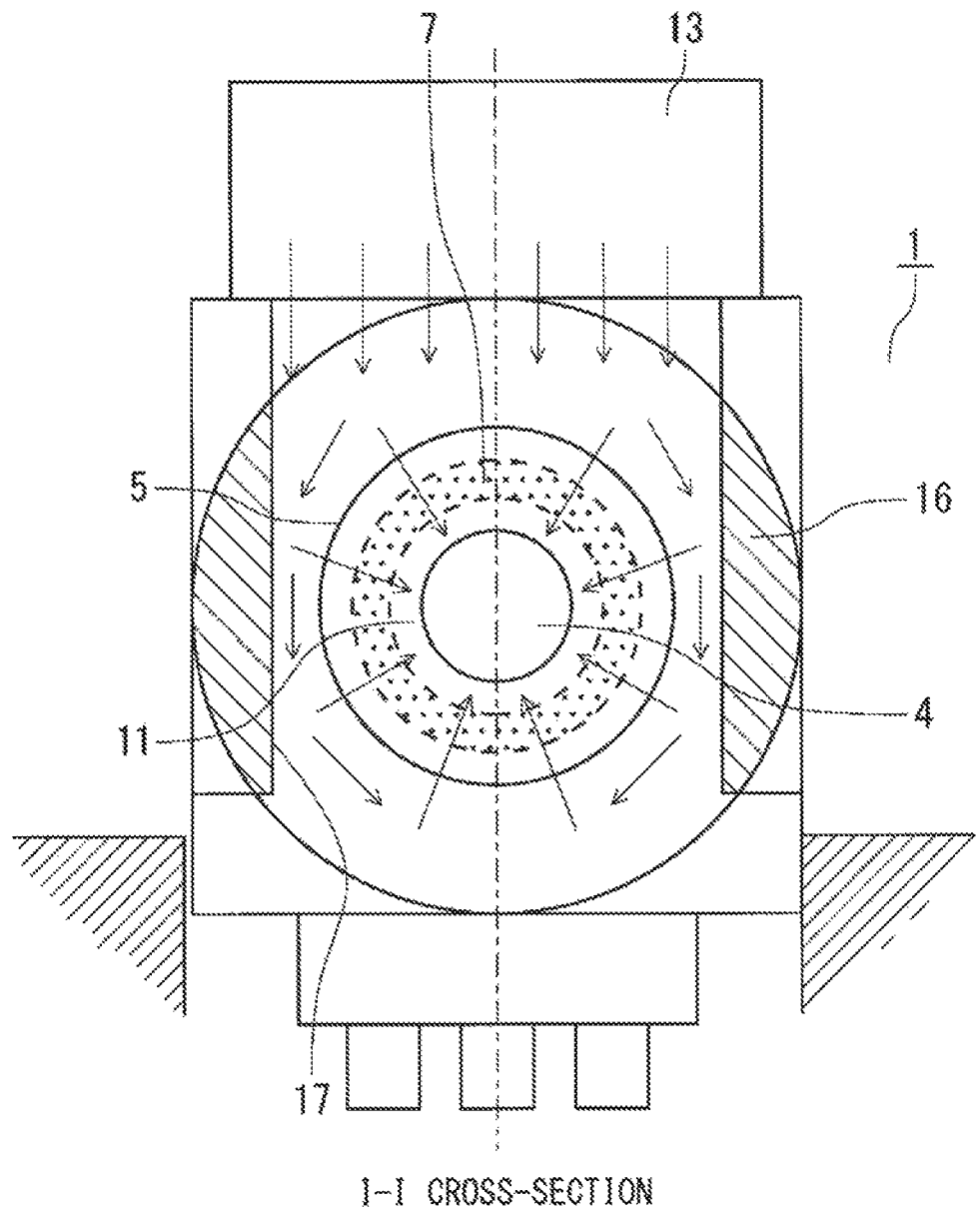
FIG. 2 is a front cross-sectional view of the rotary electric machine according to Embodiment 1 of the present invention.

FIG. 2 is a front cross-sectional view of the rotary electric machine 1, and is a cross-sectional view as viewed from I-I direction in FIG. 1.

Figure 3:
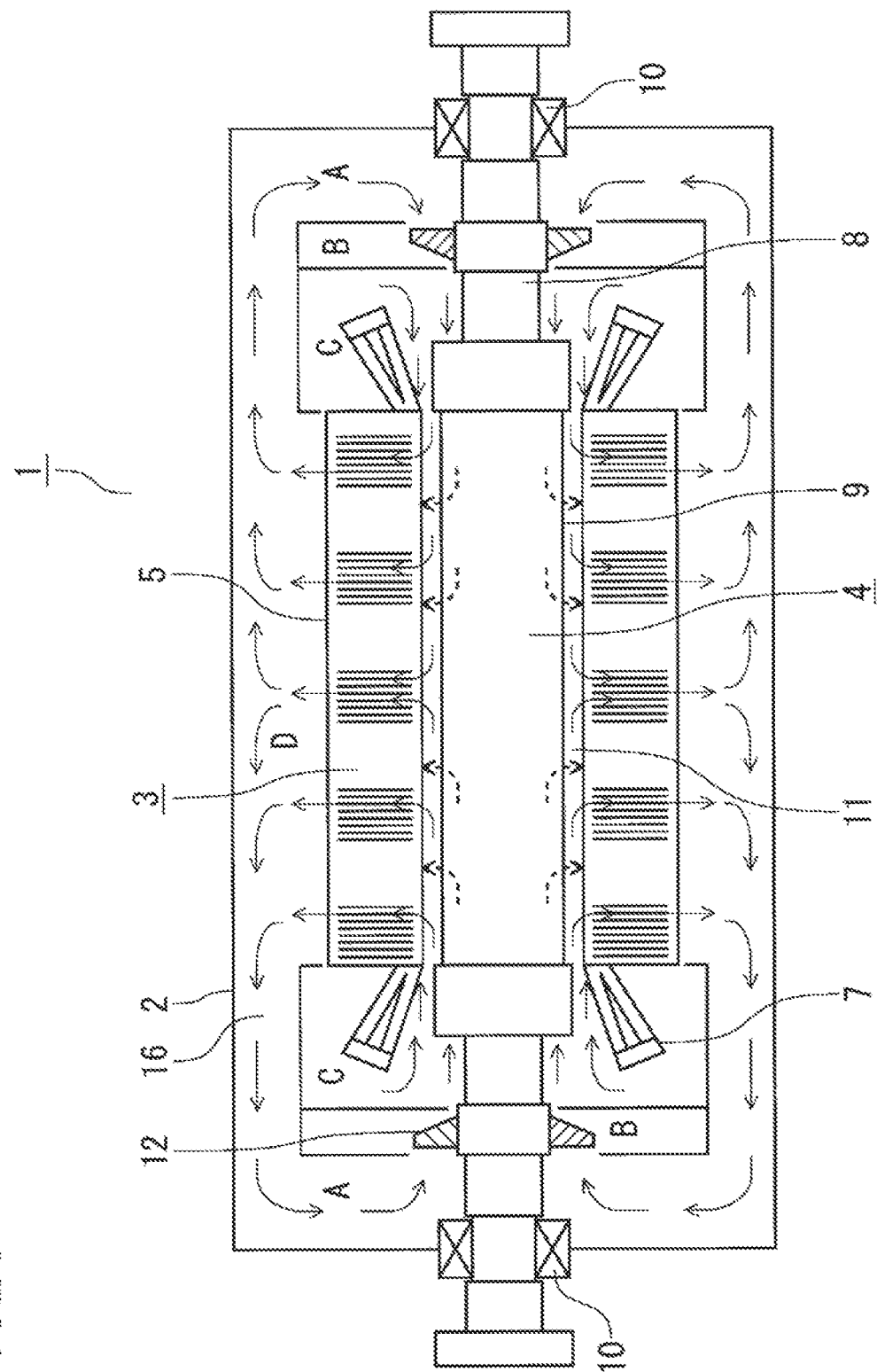
FIG. 3 is a plan cross-sectional view of the rotary electric machine according to Embodiment 1 of the present invention.

FIG. 3 is a cross-sectional view of the rotary electric machine 1 as viewed from an upper surface thereof, and shows a cross-sectional view taken along a horizontal plane passing through the central axis of the rotor.

Hereinafter, Embodiment 1 of the present invention will be described with reference to the drawings. In the present embodiment, a description will be given on the assumption that the rotary electric machine is a totally enclosed horizontal turbine generator.

The rotary electric machine 1 includes: a stator 3 disposed within a casing 2 filled with a cooling gas; a rotor 4 provided at the inner peripheral side of the stator 3 with a predetermined gap therebetween; fans 12 for circulating the cooling gas within the casing 2; and gas coolers 14 for cooling the cooling gas. These components will be sequentially described below.

The stator 3 includes: a stator core 5 formed of magnetic steel plates stacked in an axial direction; and a stator coil 6 inserted into a slot formed in an inner peripheral portion of the stator core 5. In the stator core 5, gas passages (not shown) through which the cooling gas is caused to flow in a radial direction are formed at predetermined intervals in the axial direction.

A main lead (not shown) is connected to a lower side of one (a left one in the drawing) of stator coil ends 7 at both end sides of the stator coil 6 and extended to the outside of the casing 2. The main lead is a conductor for taking out generated power from the stator coil 6.

Meanwhile, the rotor 4 is rotatably disposed at an inner peripheral portion of the stator 3 and has an outer diameter that allows a predetermined gap 11 to be ensured. The rotor 4 includes a rotation shaft 8, a rotor core 9 mounted on the rotation shaft 8, and a rotor coil (not shown) inserted into a slot formed in the axial direction of the rotor core 9, and both end portions of the rotation shaft 8 are rotatably supported by bearings 10. In addition, in the slot portion and the coil portion described above, a gas passage (not shown) for the cooling gas is provided so as to extend in the axial direction and then pass through in the radial direction.

The fans 12 are mounted near both end portions of the rotation shaft 8 and inward of the bearings 10. The fans 12 are a type of fans that generate air flow in a centrifugal direction, and are used for circulating, within the casing 2, the cooling gas with which the casing 2 is filled. In Embodiment 1, each fan 12 is configured to suck the cooling gas from the axial side with a side opposite to a main body in which the rotor coil is present (a side facing each bearing 10) as an intake side, and send the cooling gas to the outer peripheral side.

In FIG. 1, the gas coolers 14 that are of a water-cooling type are mounted on the upper surface of the casing 2 and near portions at which the stator coil ends 7 are located.

As shown in FIG. 1, each gas cooler 14 is installed near an opening 15 in the upper surface of the casing 2 so as to be housed in a hermetically sealed gas cooler chamber 13 provided at the upper surface of the casing 2, and is provided within a later-described gas circulation passage for the cooling gas. Cooling water is introduced from the outside to each gas cooler 14 and is circulated through a small tube within the gas cooler 14, so that heat is exchanged via many fins thereof to cool the cooling gas.

Next, installation of each gas cooler 14 to the casing 2 and the function of the stator coil ends 7 will be described.

The opening 15 of the casing 2 is provided directly above each stator coil end 7 as a passage through which the cooling gas flows from the gas cooler 14 toward a space (space C) surrounding a later-described stator coil end 7 portion. In the stator coil end 7, a coil is disposed in a mesh-like state. When the cooling gas passes through the stator coil end 7, the stator coil end 7 becomes resistance. Therefore, the cooling gas initially flows in the area surrounding the stator coil end 7 without flowing through only a part of the stator coil end 7 in a concentrated manner, and then attempts to flow into the stator coil end 7 from all directions of the stator coil end 7. Accordingly, cooling only a part of the stator coil end 7 can be prevented.

If the stator coil end 7 and the opening 15 through which the cooling gas from the gas cooler 14 passes are displaced relative to each other in the axial direction, there is no obstacle to the flow of the cooling gas and the cooling gas flows directly into the gap 11 between the stator 3 and the rotor 4. As a result, only a part of the stator coil end 7 is cooled.

However, when the stator coil end 7 and the opening 15 through which the cooling gas from the gas cooler 14 passes are not displaced relative to each other in the axial direction, the cooling gas is hard to flow through the stator coil end 7 and thus becomes dispersed. Therefore, the stator coil end 7 is uniformly cooled.

In order to efficiently circulate the cooling gas within the casing 2, the gas circulation passage is formed within the casing 2. Next, the configuration of the passage will be described. Specifically, a description will be given according to flow of the cooling gas from a portion at the left fan 12 in FIG. 1.

A bearing 10 side of the fan 12 is partitioned off by a partition plate, and a space A (shown by the capital letter in the drawing. The same applies hereinafter) formed by this partition plate and the casing 2 is a space at the intake side of the fan 12. A partition plate is also provided at the rotor main body side of the fan 12 to form a space B surrounding the fan 12. The opening is formed above the space B and in the upper surface of the casing 2 and communicates with the gas cooler chamber 13. Since the gas cooler 14 is installed near the opening 15 in the upper surface of the casing 2, the cooling gas is sent from the gas cooler chamber 13 through the gas cooler 14 to the stator coil end 7 side.

As described above, a method in which the cooling gas from the fan 12 is initially sent to the gas cooler 14 and cooled therein is adopted. Then, the low-temperature cooling gas cooled by the gas cooler 14 is sent from the area closest to the gas cooler 14, to the stator coil end 7 side.

The stator coil end 7 portion partitions off the outer peripheral portion to form the space C surrounding the stator coil end 7 portion. The cooling gas that has flowed into the space C flows into the gas passage that is formed within the rotor 4 and is not shown, and the gap 11 between an inner diameter portion of the stator 3 and an outer diameter portion of the rotor 4, flows in the radial direction through the gas passages that are in the stator 3 and are not shown, and is sent to a space D formed between the outer periphery of the stator 3 and the casing 2. Thereafter, the cooling gas is separated in the space D to both end sides, turns and flows in a direction toward the end portion of the casing 2, and returns to the space A. That is, such a circulation passage is formed.

The cooling gas sent from the right fan 12 circulates through a passage that is formed similarly (substantially symmetrically to the above passage).

Here, partition walls 17 that partition off the space C and a passage for the cooling gas from the space D toward the space A will be described.

The partition walls 17 that partition off the space C and the passage for the cooling gas from the space D toward the space A are provided at both sides of each stator coil end 7. The partition walls 17 are positioned such that a passage 16 for the cooling gas from the space D toward the space A is sufficiently ensured at the outer side of each partition wall 17 and a passage through which the cooling gas coming from the gas cooler 14 flows downward along the outer periphery of the stator coil end 7 is sufficiently ensured at the inner side of each partition wall 17. Furthermore, a distance for insulation is ensured between each partition wall 17 and the stator coil end 7.

As described above, regarding the gas circulation passage, when the rotor 4 rotates, each fan 12 rotates, and the cooling gas is sucked from the axial side of the space A, is sent out in the outer peripheral direction of the space B, is sent to the space B→the gas cooler chamber 13→the gas cooler 14 (the cooling gas is cooled therein)→the opening 15→the space C→the gap 11 and the gas passages formed in the rotor and the stator→the space D, flows through the passage 16 for the cooling gas from the space D toward the space A, and returns to the space A.

In the rotary electric machine 1 of Embodiment 1, the one gas cooler 14 is installed above each stator coil end 7 and on the upper surface of the casing 2, and the width of the casing 2 is small as compared to the conventional structure.

If such a configuration is merely provided, a problem arises that only a portion of the stator coil end in the vicinity of the exit of the gas cooler is cooled but a portion of the stator coil end distant from the gas cooler is not sufficiently cooled. The invention of Embodiment 1 is indented to decrease the installation area of the rotary electric machine while solving such a problem.

The cooling gas coming out from each gas cooler 14 flows through the opening 15, enters the space C, and cool the stator coil end 7. Since the opening 15 is provided directly above each stator coil end 7, the cooling gas flows through the outer periphery side of the stator coil end 7 and attempts to flow into the stator coil end 7 from all directions of the stator coil end 7. Accordingly, cooling only a part of the stator coil end 7 can be prevented.

Furthermore, the partition walls 17 that partition off the passage for the cooling gas partition off the space C and the passage for the cooling gas from the space D toward the space A, and the distance for insulation is ensured between each partition wall 17 and the stator coil end 7. Thus, the passage through which the gas flows from the space D to the space A is ensured.

As described above, in the rotary electric machine of Embodiment 1, the one gas cooler is installed in each gas cooling chamber provided at the upper surface of the casing, the opening of the casing is provided directly above each stator coil end, and the partition walls are provided which partition off the space (space C) surrounding the stator coil end portion and the passage for the cooling gas from the space (space D) between the outer periphery of the stator and the casing toward the space (space A) at the intake side of the fan, thereby ensuring the passage for the cooling gas. Therefore, the installation area of the rotary electric machine can be decreased without deteriorating cooling performance for the stator coil ends.

Since the rotary electric machine of Embodiment 1 can decrease the installation area thereof, the size of the machine can be reduced, and the number of the gas coolers can be decreased, so that the rotary electric machine has effects of energy saving and durability improvement.

Embodiment 2

A rotary electric machine of Embodiment 2 has a structure in which guide plates are provided within the space surrounding the stator coil end and below the opening, thereby dispersing flow of the cooling gas from the gas cooler to the stator coil end portion.

Hereinafter, regarding the configuration and operation of the rotary electric machine according to Embodiment 2, the differences from Embodiment 1 will be mainly described with reference to FIG. 4, which is a side cross-sectional view of the rotary electric machine, and FIG. 5, which is a front cross-sectional view of the rotary electric machine.

Figure 4:
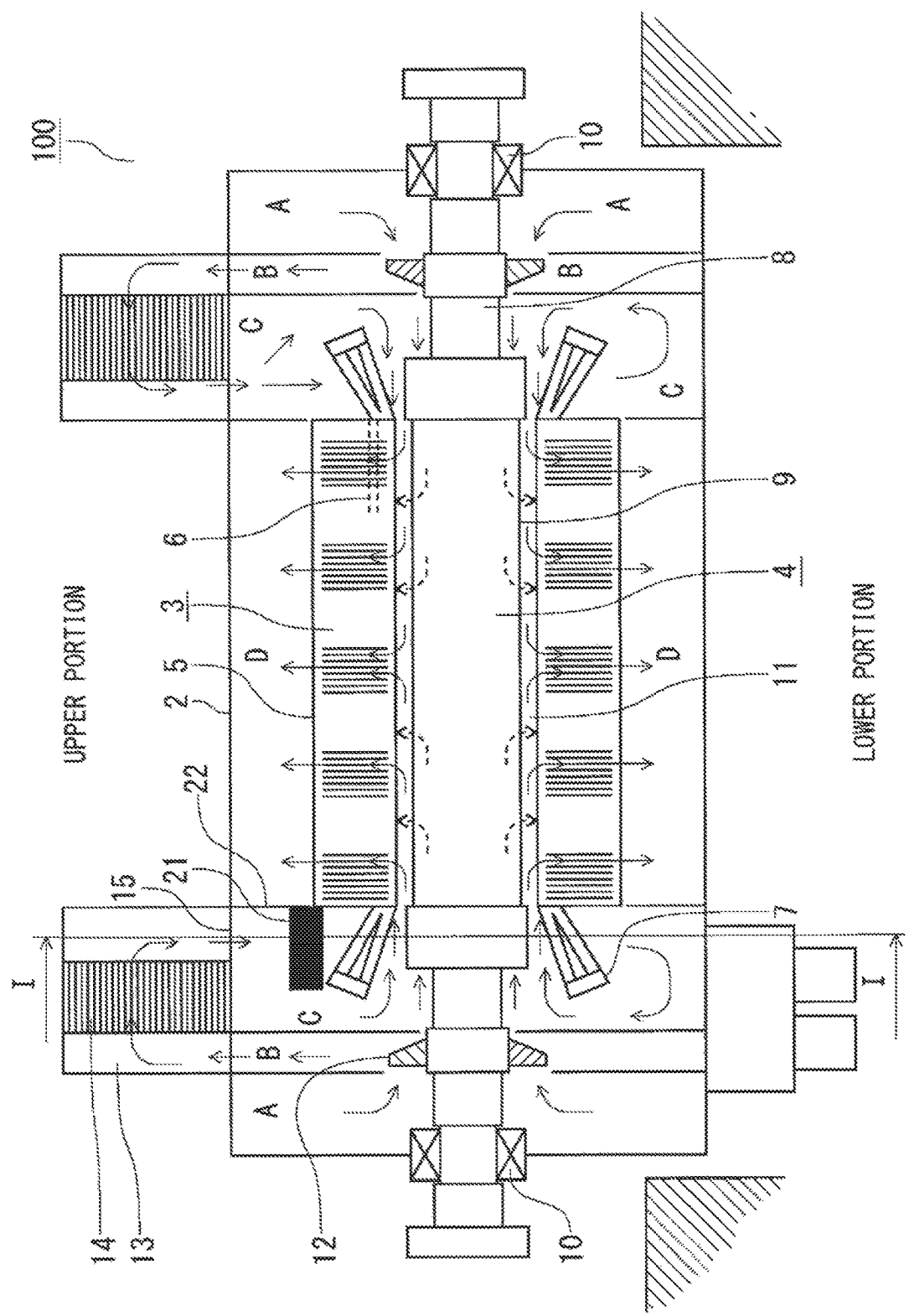
FIG. 4 is a side cross-sectional view of a rotary electric machine according to Embodiment 2 of the present invention.

In FIGS. 4 and 5, components that are the same as or correspond to those in FIGS. 1 and 2 of Embodiment 1 are denoted by the same reference characters.

FIG. 4 is a cross-sectional view of the rotary electric machine 100 of Embodiment 2 of the present invention as viewed from a side surface thereof, and shows a cross-sectional view taken along a vertical plane passing through the central axis of a rotor.

FIG. 5 is a front cross-sectional view of the rotary electric machine 100, and is a cross-sectional view as viewed from I-I direction in FIG. 4.

A cross-sectional view of the rotary electric machine 100 as viewed from an upper surface thereof is the same as FIG. 3 of Embodiment 1 and thus is omitted.

The rotary electric machine 100 of Embodiment 2 of the present invention is different from the rotary electric machine 1 of Embodiment 1 in that guide plates 21 are provided within the space (space C) surrounding the stator coil end portion and below the opening 15.

In FIGS. 4 and 5, the guide plates 21 are provided at the downstream side of the opening 15 of the passage for the cooling gas from the gas cooler 14 toward the space C such that the cooling gas flows to a plurality of directions.

FIG. 4 shows an example in which the guide plates 21 are fixed to an inner-frame plate 22 that partitions off the space C and the space D, by means of bolts or melding.

Each guide plate 21 has an inclination angle relative to the opening surface of the opening 15 such that the cooling gas flows to a plurality of directions. The shape and the inclination angle of each guide plate 21 are determined in consideration of the capacity of the gas cooler 14 and the shape of the stator coil end 7 portion, etc.

As described in Embodiment 1, if the exit of the gas cooler 14 and the stator coil end 7 are displaced relative to each other in the axial direction, there is no obstacle to the flow of the cooling gas and the cooling gas flows into the gap 11 between the stator 3 and the rotor 4, so that only a part of the stator coil end 7 is cooled.

Even in the case where the exit of the gas cooler 14 and the stator coil end 7 are displaced relative to each other in the axial direction as described above, by installing the guide plates 21, the cooling gas flows to a plurality of directions and becomes dispersed, so that the stator coil end 7 is uniformly cooled.

In the case where the exit of the gas cooler 14 and the stator coil end 7 coincide with each other in the axial direction, by installing the guide plates 21, the cooling gas becomes further dispersed, so that the stator coil end 7 is more uniformly cooled.

The gas circulation passage of the rotary electric machine 100 of Embodiment 2 is as follows. When the rotor 4 rotates, each fan 12 rotates, the cooling gas is sucked from the axial side of the space A, is sent out in the outer peripheral direction of the space B, is sent to the space B→the gas cooler chamber 13→the gas cooler 14→the opening 15→the guide plates 21→the space C→the gap 11 and the gas passages formed in the rotor and the stator→the space D, flows through the passage 16 for the cooling gas from the space D toward the space A, and returns to the space A.

As described above, the rotary electric machine of Embodiment 2 has a structure in which the guide plates are provided within the space surrounding the stator coil end portion and below the opening, thereby dispersing flow of the cooling gas from the gas cooler to the stator coil end portion. Therefore, the installation area of the rotary electric machine can be decreased without deteriorating cooling performance for the stator coil ends.

Moreover, the rotary electric machine of Embodiment 2 can further improve the cooling performance for the stator coil ends.

It is noted that, within the scope of the present invention, the above embodiments may be freely combined with each other, or each of the above embodiments may be modified or abbreviated as appropriate.

INDUSTRIAL APPLICABILITY

The present invention relates to a rotary electric machine that allows an installation area thereof to be decreased without deteriorating cooling performance for the stator coil ends, and is widely applicable to a turbine generator and the like.

The invention claimed is:

1. A rotary electric machine comprising:
a stator disposed within a casing filled with a cooling gas, the stator including a stator core, a stator coil, and a pair of stator coil ends at both end portions of the stator coil;
a rotor disposed at an inner peripheral side of the stator with a gap therebetween and including a rotor core mounted on a rotation shaft and a rotor coil;
a pair of fans mounted near both end portions of the rotation shaft and each configured to suck the cooling gas from an axial side with a side opposite to the rotor coil as an intake side and send the cooling gas to an outer peripheral side; and
a pair of gas coolers housed in a pair of gas cooler chambers provided at an upper portion of the casing in which the pair of stator coil ends are located, the pair of gas coolers being installed near a pair of openings of the casing and above the pair of stator coil ends,
wherein a pair of gas circulation passages are formed in which, for each gas circulation passage of the pair of gas circulation passages, the cooling gas sucked by one of the pair of fans from one of a pair of spaces A, each space A of the pair of spaces A being provided at the intake side of one of the pair of fans, circulates through one of a pair of spaces B, each space B of the pair of spaces B surrounding one of the pair of fans→one of the pair of gas cooler chambers→one of the plurality of gas coolers→one of a pair of spaces C, each space C of the pair of spaces C including one of the pair of stator coil ends→the gap between the rotor and the stator and gas passages formed in the rotor and the stator→a space D between an outer periphery of the stator and the casing→the one of the pair of spaces A, and
wherein the cooling gas flows through the pair of openings from each gas cooler toward the space C.

2. The rotary electric machine according to claim 1, wherein partition walls are provided at both sides of each stator coil end of the pair of stator coil ends so as to partition off the pair of spaces C and a pair of gas passages for the cooling gas from the space D toward the pair of spaces A.

3. The rotary electric machine according to claim 2, wherein the partition walls are provided at such positions that a gas passage for the cooling gas from the space D toward the space A is ensured at an outer side of each partition wall, downward gas passages through which the cooling gas flowing out from the pair of gas coolers flows downward along an outer periphery of the stator coil end is ensured at an inner side of each of the partition walls, and a distance for insulation is ensured between the stator coil end and each of the partition walls.

4. The rotary electric machine according to claim 1, wherein, for each gas circulation passage of the pair of gas circulation passages, in a portion from the one of the pair of gas coolers to the one of the pair of spaces C, a guide plate is provided at a downstream side of the one of the pair of openings of the casing so as to have an inclination angle relative to an opening surface of the one of the pair of openings for causing the cooling gas to flow to a plurality of directions.

5. The rotary electric machine according to claim 4, wherein partition walls are provided at both sides of each stator coil end of the pair of stator coil ends so as to partition off the pair of spaces C and a pair of passages for the cooling gas from the space D toward the pair of spaces A.

6. The rotary electric machine according to claim 5, wherein the partition walls are provided at such positions that a gas passage for the cooling gas from the space D toward the space A is ensured at an outer side of each partition wall, downward gas passages through which the cooling gas flowing out from the pair of gas coolers flows downward along an outer periphery of the stator coil end is ensured at an inner side of each of the partition walls, and a distance for insulation is ensured between the stator coil end and each of the partition walls.

7. A rotary electric machine comprising:
a stator disposed within a casing filled with a cooling gas, the stator including a stator core, a stator coil, and a pair of stator coil ends at both end portions of the stator coil;
a rotor disposed at an inner peripheral side of the stator with a gap therebetween and including a rotor core mounted on a rotation shaft and a rotor coil;
a pair of fans mounted near both end portions of the rotation shaft and each configured to suck the cooling gas from an axial side with a side opposite to the rotor coil as an intake side and send the cooling gas to an outer peripheral side; and
a pair of gas coolers housed in a pair of gas cooler chambers provided at an upper portion of the casing in which the pair of stator coil ends are located, the pair of gas coolers being installed near a pair of openings of the casing and above the pair of stator coil ends,
wherein a pair of gas circulation passages are formed in which, for each gas circulation passage of the pair of gas circulation passages, the cooling gas sucked by one of the pair of fans from one of a pair of spaces A, each space A of the pair of spaces A being provided at the intake side of one of the pair of fans, circulates through one of a pair of spaces B, each space B of the pair of spaces B surrounding one of the pair of fans→one of the pair of gas cooler chambers→one of the plurality of gas coolers→one of a pair of spaces C, each space C of the pair of spaces C including one of the pair of stator coil ends→the gap between the rotor and the stator and gas passages formed in the rotor and the stator→a space D between an outer periphery of the stator and the casing→the one of the pair of spaces A, and wherein, for each gas circulation passage of the pair of gas circulation passages, in a portion from the one of the pair of gas coolers to the one of the pair of spaces C, a guide plate is provided at a downstream side of the one of the pair of openings of the casing so as to have an inclination angle relative to an opening surface of the one of the pair of openings for causing the cooling gas to flow to a plurality of directions.

8. The rotary electric machine according to claim 7, wherein partition walls are provided at both sides of each stator coil end of the pair of stator coil ends so as to partition off the pair of spaces C and a pair of passages for the cooling gas from the space D toward the pair of spaces A.

9. The rotary electric machine according to claim 8, wherein the partition walls are provided at such positions that a gas passage for the cooling gas from the space D toward the space A is ensured at an outer side of each partition wall, downward gas passages through which the cooling gas flowing out from the pair of gas coolers flows downward along an outer periphery of the stator coil end is ensured at an inner side of each of the partition walls, and a distance for insulation is ensured between the stator coil end and each of the partition walls.

10. A rotary electric machine comprising:
a stator disposed within a casing filled with a cooling gas, the stator including a stator core, a stator coil, and a pair of stator coil ends at both end portions of the stator coil;
a rotor disposed at an inner peripheral side of the stator with a gap therebetween and including a rotor core mounted on a rotation shaft and a rotor coil;
a pair of fans mounted near both end portions of the rotation shaft and each configured to suck the cooling gas from an axial side with a side opposite to the rotor coil as an intake side and send the cooling gas to an outer peripheral side; and
a pair of gas coolers housed in a pair of gas cooler chambers provided at an upper portion of the casing in which the pair of stator coil ends are located, the pair of gas coolers being installed near a pair of openings of the casing and above the pair of stator coil ends, wherein a pair of gas circulation passages are formed in which, for each gas circulation passage of the pair of gas circulation passages, the cooling gas sucked by one of the pair of fans from one of a pair of spaces A, each space A of the pair of spaces A being provided at the intake side of one of the pair of fans, circulates through one of a pair of spaces B, each space B of the pair of spaces B surrounding one of the pair of fans→one of the pair of gas cooler chambers→one of the plurality of gas coolers→one of a pair of spaces C, each space C of the pair of spaces C including one of the pair of stator coil ends→the gap between the rotor and the stator and gas passages formed in the rotor and the stator→a space D between an outer periphery of the stator and the casing→the one of the pair of spaces A, and wherein partition walls are provided at both sides of each stator coil end of the pair of stator coil ends so as to partition off the pair of spaces C and a pair of passages for the cooling gas from the space D toward the pair of spaces A.

11. The rotary electric machine according to claim 10, wherein the partition walls are provided at such positions that a gas passage for the cooling gas from the space D toward the space A is ensured at an outer side of each partition wall, downward gas passages through which the cooling gas flowing out from the pair of gas coolers flows downward along an outer periphery of the stator coil end is ensured at an inner side of each of the partition walls, and a distance for insulation is ensured between the stator coil end and each of the partition walls.

\* \* \* \* \*